United States Patent
Teo et al.

(10) Patent No.: US 9,213,597 B2
(45) Date of Patent: Dec. 15, 2015

(54) MEMORY STORAGE DEVICE, MEMORY CONTROLLER THEREOF, AND METHOD FOR PROGRAMMING DATA THEREOF

(75) Inventors: Wei-Chen Teo, Miaoli County (TW); Pi-Chi Yang, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 329 days.

(21) Appl. No.: 13/286,226

(22) Filed: Nov. 1, 2011

(65) Prior Publication Data

US 2013/0019142 A1 Jan. 17, 2013

(30) Foreign Application Priority Data

Jul. 12, 2011 (TW) .............................. 100124634 A (51) Int. Cl.
*G11C 29/00* (2006.01)
*G06F 11/10* (2006.01)
(52) U.S. Cl.
CPC .................................. *G06F 11/1048* (2013.01)
(58) Field of Classification Search
CPC ............ G06F 11/1076; G06F 11/1008; G06F 11/1068; G06F 11/1044; H05K 999/99
USPC ......................................................... 714/763
See application file for complete search history.

(56) References Cited

U.S. PATENT DOCUMENTS

| 6,041,001 A * | 3/2000 | Estakhri ........................ 365/200 |
| 8,751,900 B2 * | 6/2014 | Kim ...................... G06F 11/106 714/763 |
| 2008/0163028 A1 * | 7/2008 | Mokhlesi ....................... 714/763 |
| 2009/0070529 A1 * | 3/2009 | Mee ..................... G06F 11/1441 711/114 |
| 2010/0131806 A1 * | 5/2010 | Weingarten et al. ............ 714/54 |
| 2012/0066439 A1 * | 3/2012 | Fillingim ....................... 711/103 |
| 2012/0089805 A1 * | 4/2012 | Liu ................................ 711/173 |

(Continued)

FOREIGN PATENT DOCUMENTS

| CN | 1622213 | 6/2005 |
| CN | 101763903 | 6/2010 |
| CN | 101944386 | 1/2011 |
| CN | 101996688 | 3/2011 |

OTHER PUBLICATIONS

"Office Action of Taiwan Counterpart Application", issued on Jun. 26, 2014, p. 1-p. 8, in which the listed reference(Ref. 1) was cited.

(Continued)

*Primary Examiner* — Albert Decady
*Assistant Examiner* — Enam Ahmed
(74) *Attorney, Agent, or Firm* — Jianq Chyun IP Office (57) ABSTRACT

A memory storage device, a memory controller thereof, and a method for programming data thereof are provided. The memory storage device having an error checking and correcting (ECC) circuit and a rewritable non-volatile memory chip is coupled to a host system. The method includes determining whether write data to be written into the rewritable non-volatile memory chip belongs to a specific type. The method also includes generating at least one first type ECC code with a first length by the ECC circuit according to the write data if the write data belongs to the specific type. The method further includes generating at least one second type ECC code with a second length by the ECC circuit according to the write data if the write data does not belong to the specific type. In which, the first length is longer than the second length.

21 Claims, 6 Drawing Sheets

(56) References Cited

U.S. PATENT DOCUMENTS

2012/0272123 A1* 10/2012 Yeh ............................. 714/773
2013/0145106 A1*  6/2013 Kan ............................. 711/147

OTHER PUBLICATIONS

"Office Action of China Counterpart Application", issued on Aug. 4, 2014, p. 1-p. 9, in which the listed references(Ref. 2-3) were cited.

* cited by examiner

MEMORY STORAGE DEVICE, MEMORY CONTROLLER THEREOF, AND METHOD FOR PROGRAMMING DATA THEREOF

CROSS-REFERENCE TO RELATED APPLICATION

This application claims the priority benefit of Taiwan application serial no. 100124634, filed on Jul. 12, 2011. The entirety of the above-mentioned patent application is hereby incorporated by reference herein and made a part of this specification.

BACKGROUND

1. Technology Field

The invention relates to a method for programming data. Particularly, the invention relates to a method for programming data for strengthening protection of specific data, a memory storage device thereof and a memory controller thereof.

2. Description of Related Art

A rewritable non-volatile memory has characteristics of data non-volatility, low power consumption, small volume and non-mechanical structure, etc., so that it is widely used in various electronic devices. The rewritable non-volatile memory has a plurality of physical blocks, and each physical block has a plurality of physical pages. The physical block is the smallest unit for erasing data, and the physical page is the smallest unit for programming data. A memory management circuit within a storage device converts a logical access address to be accessed by a host system into a corresponding logical page, and then accesses data of a physical page corresponding to the logical page.

Since data stored in the rewritable non-volatile memory may have error bits due to factors such as electric leakage of a memory cell, program failure or damage, etc., the storage device using the rewritable non-volatile memory is generally configured with an error checking and correcting (ECC) circuit to ensure correctness of data. Generally, the ECC circuit uses a unified protection method to all data stored to the rewritable non-volatile memory. In other words, the ECC circuit generates an ECC code of a same length for each batch of data, so that regardless of a type of the data, the number of error bits checked and corrected by the ECC circuit is the same. However, it is lack of a powerful ECC mechanism for data of high significance which may severely influence a system operation when being damaged, so that a risk that the system cannot be used due to damage of the data cannot be reduced.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a method for programming data, a memory controller and a memory storage device, which provides a better protection for significant data that maintains a normal operation of the memory storage device, so as to improve reliability of the memory storage device.

The invention provides a method for programming data, which is adapted to a memory storage device coupled to a host system, wherein the memory storage device includes an error checking and correcting (ECC) circuit and a rewritable non-volatile memory chip, and the rewritable non-volatile memory chip includes a plurality of physical pages. The method includes determining whether write data to be written into the rewritable non-volatile memory chip belongs to a specific type. The method also includes generating at least one first type ECC code with a first length by the ECC circuit according to the write data when the write data belongs to the specific type. The method further includes generating at least one second type ECC code with a second length by the ECC circuit according to the write data when the write data does not belong to the specific type, wherein the first length is longer than the second length.

According to another aspect, the invention provides a memory controller, which is used for managing a rewritable non-volatile memory chip in a memory storage device. The memory controller includes a host system interface, a memory interface, an error checking and correcting (ECC) circuit and a memory management circuit. The host system interface is coupled to a host system. The memory interface is coupled to the rewritable non-volatile memory chip, wherein the rewritable non-volatile memory chip includes a plurality of physical pages. The memory management circuit is coupled to the host system interface, the memory interface and the ECC circuit. The memory management circuit determines whether write data to be written into the rewritable non-volatile memory chip belongs to a specific type. When the write data belongs to the specific type, the memory management circuit notifies the ECC circuit to generate at least one first type ECC code with a first length according to the write data. When the write data does not belong to the specific type, the memory management circuit notifies the ECC circuit to generate at least one second type ECC code with a second length according to the write data, wherein the first length is longer than the second length.

According to another aspect, the invention provides a memory storage device including a rewritable non-volatile memory chip, a connector and a memory controller. The rewritable non-volatile memory chip includes a plurality of physical pages. The connector is coupled to a host system. The memory controller is coupled to the rewritable non-volatile memory chip and the connector. The memory controller determines whether write data to be written into the rewritable non-volatile memory chip belongs to a specific type. When the write data belongs to the specific type, the memory controller generates at least one first type ECC code with a first length according to the write data. When the write data does not belong to the specific type, the memory controller generates at least one second type ECC code with a second length according to the write data, wherein the first length is longer than the second length.

According to the above descriptions, when the significant data of the specific type is written into the rewritable non-volatile memory chip, a relatively longer ECC code is generated, so as to increase the number of error bits of such type of data detected and corrected by the ECC circuit, so as to improve stableness of the memory storage device.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (which is also referred to as a memory storage system) includes a memory chip and a controller (which is also referred to as a control circuit). The memory storage device is generally used together with a host system, so that the host system can store data into the memory storage device or read data from the memory storage device. Moreover, the memory storage device may also include an embedded memory and software capable of being executed on the host system to substantially serving as a controller of the embedded memory.

Figure 1A:
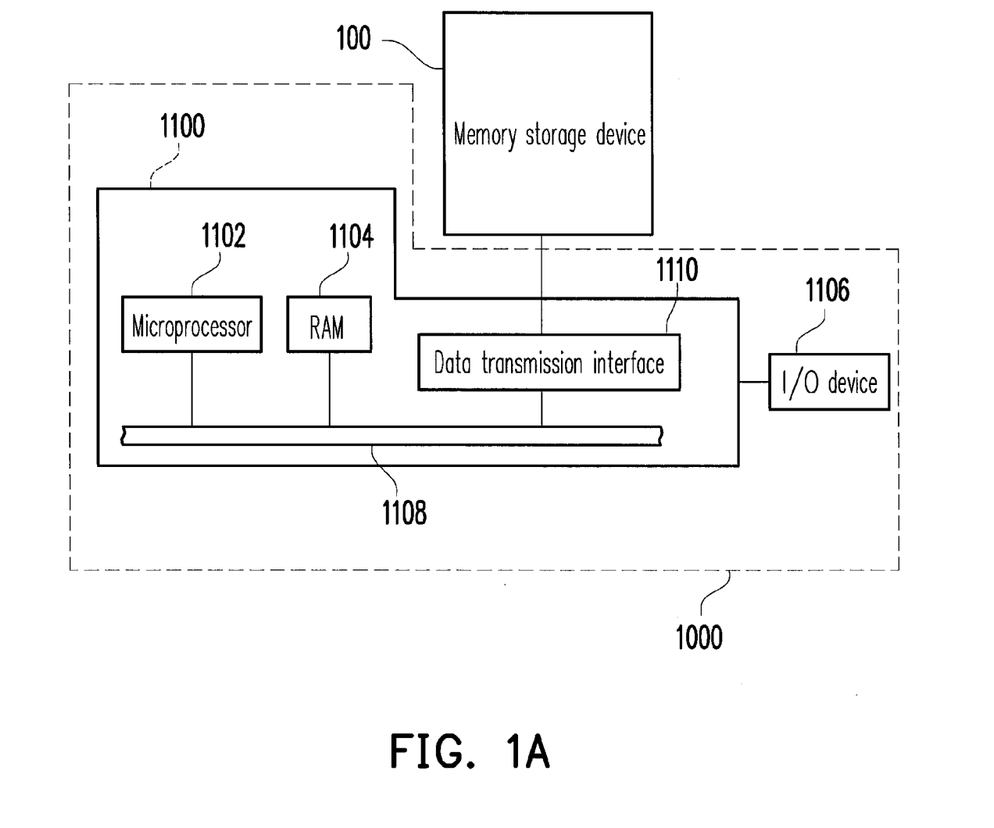
FIG. 1A is a schematic diagram illustrating a host system using a memory storage device according to an exemplary embodiment of the present invention.

FIG. 1A is a schematic diagram illustrating a host system using a memory storage device according to an exemplary embodiment of the present invention.

Figure 1B:
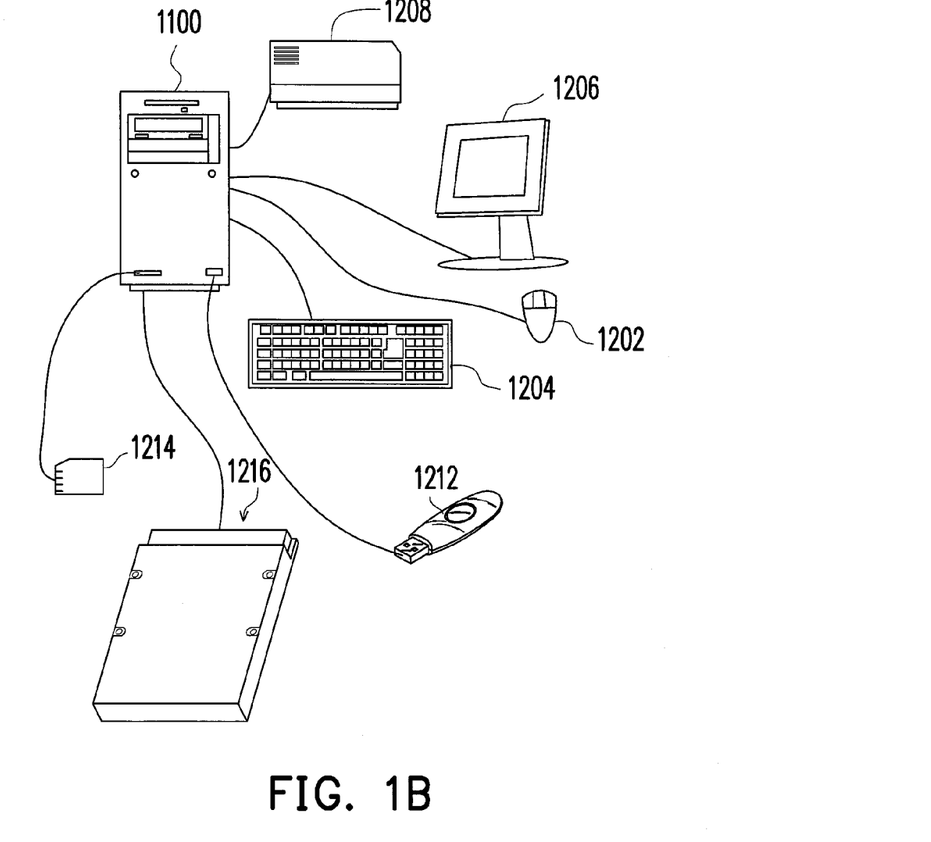
FIG. 1B is a schematic diagram illustrating a computer, input/output devices and memory storage device according to an exemplary embodiment of the present invention.

Referring to FIG. 1A, the host system 1000 generally includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 shown in FIG. 1B. It should be noticed that the devices shown in FIG. 1B are not used to limit to the I/O device 1106, and the I/O device 1106 may also include other devices.

In the present embodiment, the memory storage device 100 is coupled to the other devices of the host system 1000 through the data transmission interface 1110. Based on operations of the microprocessor 1102, the RAM 1104, and the I/O device 1106, the host system 1000 can write data into the memory storage device 100 or read data from the memory storage device 100. For example, the memory storage device 100 may be a flash drive 1212, a memory card 1214 or a solid state drive (SSD) 1216 shown in FIG. 1B.

Figure 1C:
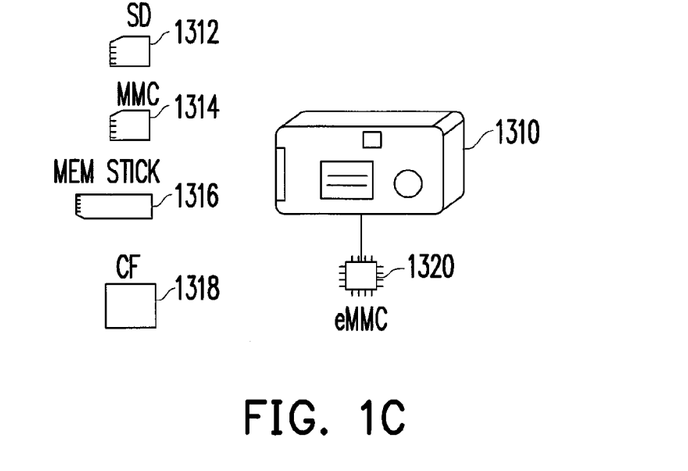
FIG. 1C is a schematic diagram illustrating a host system and memory storage device according to another exemplary embodiments of the present invention.

Generally, the host system 1000 may be any system capable of storing data. In the present exemplary embodiment, although the host system 1000 implemented by a computer system is taken as an example, in another exemplary embodiment of the present invention, the host system 1000 can also be a digital camera, a video camera, a communication device, an audio player or a video player, etc. For example, when the host system is a digital camera (video camera) 1310, the memory storage device is a secure digital (SD) card 1312, a multimedia card (MMC) card 1314, a memory stick (MS) 1316, a compact flash (CF) card 1318 or an embedded storage device 1320 (shown in FIG. 1C). The embedded storage device 1320 includes an embedded MMC (eMMC). It should be noticed that the embedded eMMC is directly coupled to a motherboard of the host system.

Figure 2:
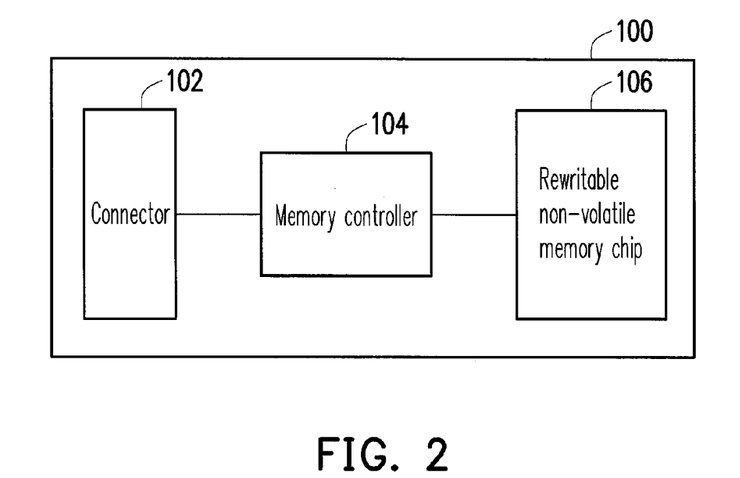
FIG. 2 is a schematic block diagram of the memory storage device of FIG. 1A.

FIG. 2 is a schematic block diagram of the memory storage device 100 of FIG. 1A. Referring to FIG. 2, the memory storage device 100 includes a connector 102, a memory controller 104 and a rewritable non-volatile memory chip 106.

The connector 102 is coupled to the memory controller 104 and configured to couple to the host system 1000. In the present exemplary embodiment, a type of transmission interface supported by the connector 102 is a serial advanced technology attachment (SATA) interface, though the invention is not limited thereto, and the type of the transmission interface of the connector 102 can also be a universal serial bus (USB) interface, a MMC interface, a parallel advanced technology attachment (PATA) interface, an institute of electrical and electronic engineers (IEEE) 1394 interface, a peripheral component interconnect express (PCI express) interface, a secure digital (SD) interface, a memory stick (MS) interface, a compact flash (CF) interface, an integrated drive electronics (IDE) interface or other suitable interfaces, which is not limited by the invention.

The memory controller 104 may execute a plurality of logic gates or control instructions implemented by a hardware form or a firmware form, and may perform a program operation, a read operation or an erase operation on the rewritable non-volatile memory chip 106 according to operation commands issued by the host system 1000. The memory controller 104 can further strengthen protection of specific data in a data program operation according to a method for programming data of the present exemplary embodiment. The method for programming data of the present exemplary embodiment is described later with reference of figures.

The rewritable non-volatile memory chip 106 is coupled to the memory controller 104. The rewritable non-volatile memory chip 106 includes a plurality of physical blocks, and each physical block includes a plurality of physical pages. For example, the rewritable non-volatile memory chip 106 is a multi level cell (MLC) NAND flash memory chip. However, the present invention is not limited thereto, and the rewritable non-volatile memory module 106 may also be a single level cell (SLC) NAND flash memory chip, other flash memory chips or other memory chips having the same characteristic.

Figure 3:
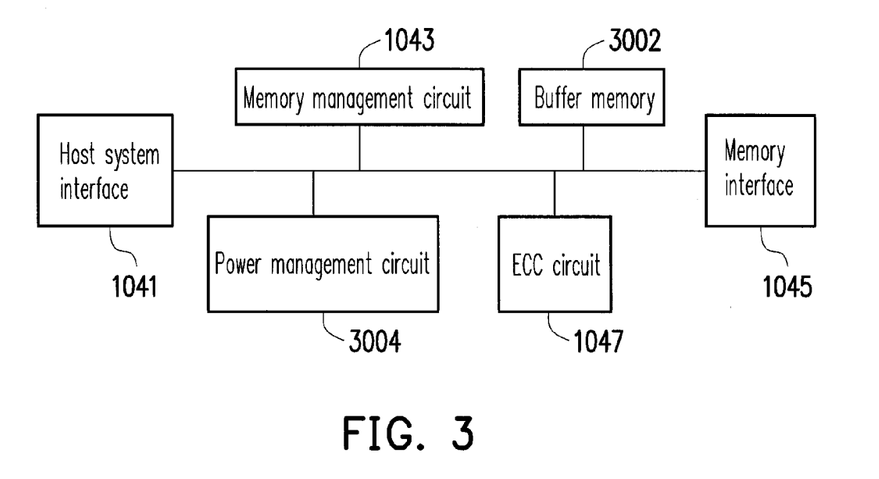
FIG. 3 is a schematic block diagram of a memory controller according to an exemplary embodiment of the invention.

FIG. 3 is a schematic block diagram of a memory controller according to an exemplary embodiment of the invention. Referring to FIG. 3, the memory controller 104 includes a host system interface 1041, a memory management circuit 1043, a memory interface 1045 and an error checking and correcting (ECC) circuit 1047.

The host system interface 1041 is coupled to the memory management circuit 1043, and is coupled to the host system 1000 through the connector 102. The host system interface 1041 is used for receiving and identifying commands and data transmitted by the host system 1000. The commands and data transmitted by the host system 1000 are transmitted to the memory management circuit 1043 through the host system interface 1041. In the present exemplary embodiment, the host system interface 1041 is the SATA interface corresponding to the connector 102, and in other exemplary embodiments, the host system interface 1041 can also be the USB interface, the MMC interface, the PATA interface, the IEEE 1394 interface, the PCI express interface, the SD interface, the MS interface, the CF interface, the IDE interface or other suitable data transmission interfaces.

The memory management circuit 1043 is used for controlling a whole operation of the memory controller 104. In detail, the memory management circuit 1043 has a plurality of control instructions, and when the memory storage device 100 is in operation, the control instructions are executed to implement the method for programming data of the present exemplary embodiment.

In an exemplary embodiment, the control instructions of the memory management circuit 1043 are implemented by a firmware form. For example, the memory management circuit 1043 has a microprocessor unit (not shown) and a read-only memory (not shown), and these control instructions are burnt into the read-only memory. When the memory storage device 100 is in operation, these control instructions are executed by the microprocessor unit to accomplish the method for programming data of the present exemplary embodiment.

In another exemplary embodiment, the control instructions of the memory management circuit 1043 may also be stored in a specific area (for example, a system area used for storing system data in the rewritable non-volatile memory chip 106) of the rewritable non-volatile memory module 106 in form of program codes. Moreover, the memory management circuit 1043 has a microprocessor unit (not shown), a read-only memory (not shown) and a random access memory (RAM) (not shown). Particularly, the read-only memory has boot codes, and when the memory controller 104 is enabled, the microprocessor unit first executes the boot codes to load the control instructions stored in the rewritable non-volatile memory chip 106 to the RAM of the memory management circuit 1043. Then, the microprocessor unit executes these control instructions to implement the method for programming data of the present exemplary embodiment. Moreover, in another exemplary embodiment of the present invention, the control instructions of the memory management circuit 1043 can also be implemented in a hardware form.

The memory interface 1045 is coupled to the memory management circuit 1043 for connecting the memory controller 104 and the rewritable non-volatile memory chip 106. In this way, the memory controller 104 is configured to access the rewritable non-volatile memory chip 106. Namely, data to be written into the rewritable non-volatile memory chip 106 is converted into a format that can be accepted by the rewritable non-volatile memory chip 106 through the memory interface 1045.

The ECC circuit 1047 is coupled to the memory management circuit 1043 and is configured to execute an error checking and correcting procedure to ensure correctness of data. In detail, when the memory management circuit 1043 receives a write command from the host system 1000, the ECC circuit 1047 generates a corresponding error checking and correcting code (ECC code) for data corresponding to the write command, and the memory management circuit 1043 writes the data corresponding to the write command and the corresponding ECC code together to the rewritable non-volatile memory chip 106. Then, when the memory management circuit 1043 reads data from the rewritable non-volatile memory chip 106, it simultaneously reads the ECC code corresponding to the data, and the ECC circuit 1047 executes the error checking and correcting procedure on the read data according to the ECC code. In the present exemplary embodiment, the ECC circuit 1047 generates ECC codes with different lengths for different types of data according to instructions of the memory management circuit 1043.

In another exemplary embodiment of the invention, the memory controller 104 further includes a buffer memory 3002. The buffer memory 3002 may be a static random access memory (SRAM), or a dynamic random access memory (DRAM), etc., which is not limited by the invention. The buffer memory 3002 is coupled to the memory management circuit 1043, and is used for temporarily storing data from the host system 1000 or data from the rewritable non-volatile memory chip 106.

In another exemplary embodiment of the invention, the memory controller 104 further includes a power management circuit 3004. The power management circuit 3004 is coupled to the memory management circuit 1043, and is used for controlling a power of the memory storage device 100.

Figure 4:
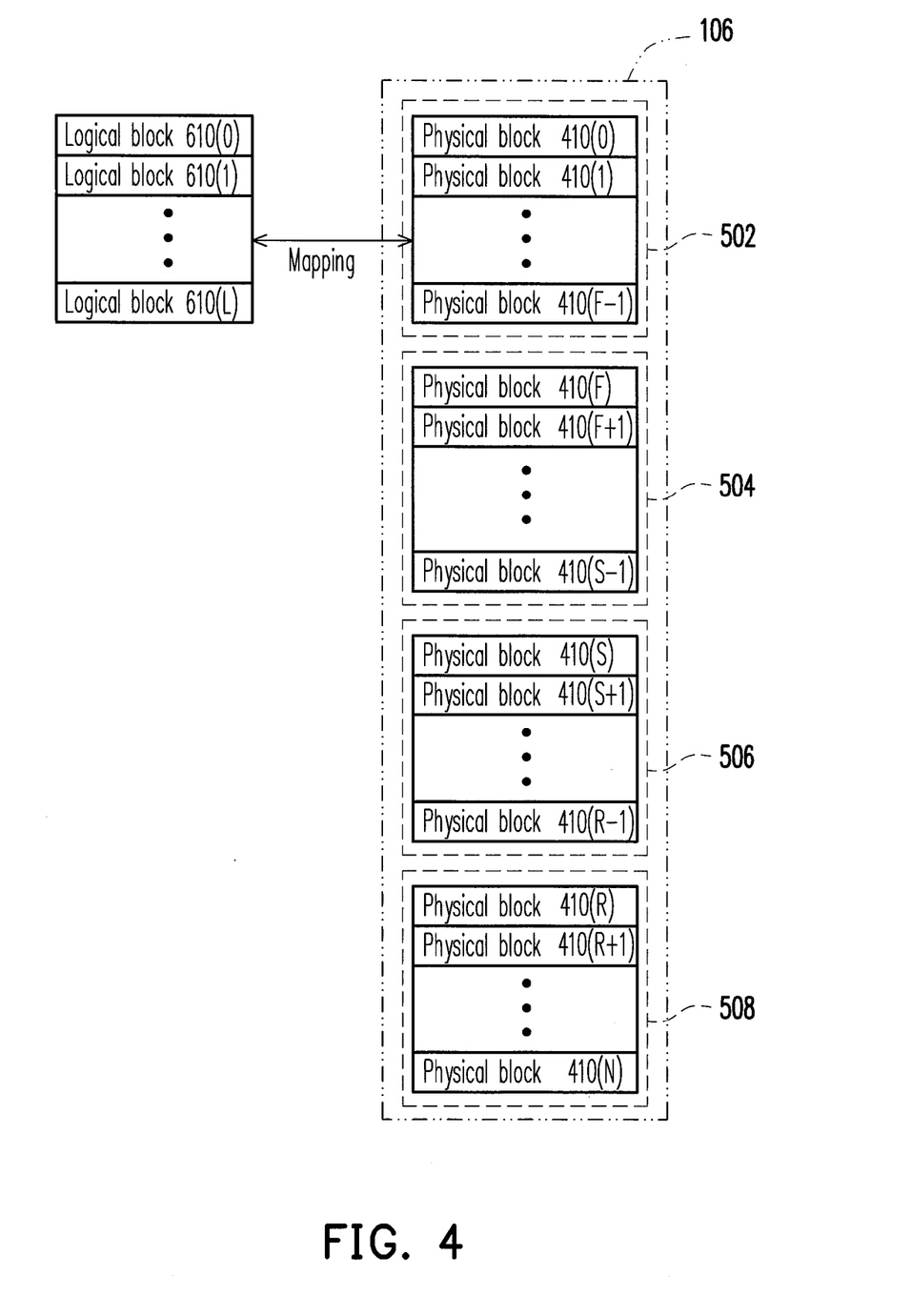
FIG. 4 is a schematic diagram illustrating an example of managing physical blocks according to an exemplary embodiment of the present invention.

FIG. 4 is a schematic diagram illustrating an example of managing physical blocks of the rewritable non-volatile memory chip 106 according to an exemplary embodiment of the present invention.

Referring to FIG. 4, the rewritable non-volatile memory chip 106 includes physical blocks 410(0)-410(N), and each physical block includes a plurality of physical pages. The memory management circuit 1043 of the memory controller 104 logically groups the physical blocks 410(0)-410(N) into a data area 502, a spare area 504, a system area 506 and a replacement area 508. The symbols F, S, R and N shown in FIG. 4 are positive integers, which respectively represent a number of the physical blocks configured in each area, and can be determined by the manufacturer of the memory storage device 100 according to a capacity of the rewritable non-volatile memory chip 106.

The physical blocks logically belonging to the data area 502 and the spare area 504 are used for storing data from the host system 1000. In detail, the physical blocks in the data area 502 are regarded as physical blocks already stored with data, and the physical blocks in the spare area 504 are used for substituting the physical blocks of the data area 502. In other words, the physical blocks in the spare area 504 are empty or usable physical blocks (i.e. physical blocks that are not stored with data or physical blocks stored with data marked to be invalid). When a write command and data to be written are received from the host system 1000, the memory management circuit 1043 selects a physical block from the spare area 504, and write the data into the selected physical block to substitute the physical block of the data area 502.

The physical blocks logically belonging to the system area 506 are used for storing system data. For example, the system data includes information such as the manufacturer and model of the rewritable non-volatile memory chip 106 and various tables established by the memory management circuit 1043 for managing the physical blocks when the host system 1000 uses the memory storage device 100.

The physical blocks logically belonging to the replacement area 508 are used for replacing damaged physical blocks when the physical blocks in the data area 502, the spare area 504 or the system area 506 are damaged. In detail, when the replacement area 508 still has normal physical blocks and some physical blocks in the data area 502 are damaged, the memory management circuit 1043 selects the normal physical blocks from the replacement area 508 to replace the damaged physical blocks in the data area 502.

To facilitate the host system 1000 accessing the rewritable non-volatile memory chip 106, the memory management circuit 1043 configures a plurality of logical blocks 610(0)-610(L) for mapping to the physical blocks 410(0)-410(F-1) of the data area 502, where each logical block has a plurality of logical pages, and the logical pages in the logical blocks 610(0)-610(L) are sequentially mapped to the physical pages of the physical blocks 410(0)-410(F-1).

In detail, the memory management circuit 1043 provides the configured logical blocks 610(0)-610(L) to the host system 1000, and maintains a logical block-physical block mapping table to record a mapping relationship between the logical blocks 610(0)-610(L) and the physical blocks 410(0)-410(F-1). Therefore, when the host system 1000 is about to access a certain logical access address, the memory management circuit 1043 converts the logical access address into logical pages of the corresponding logical block, and accesses data of the corresponding physical pages according to the logical block-physical block mapping table.

Regarding all data written into the rewritable non-volatile memory chip 106, damage of certain data may directly influence a normal operation of the memory storage device 100. For example, if various mapping table established for managing the physical blocks are damaged, the memory management circuit 1043 cannot correctly access data to be accessed by the host system 1000. Further, if the control instructions of the memory management circuit 1043 are stored in the rewritable non-volatile memory chip 106 in form of program codes, and if the program codes are damaged, the memory controller 104 is failed, and the host system 1000 cannot use the memory storage device 100.

Therefore, to strengthen protection of data that directly influences the operation of the memory storage device 100, each time when the memory management circuit 1043 is about to program write data to the rewritable non-volatile memory chip 106, it determines whether the write data belongs to a specific type required to be particularly protected. For example, if the write data is not from the host system 1000, the write data is data other than user data, or a location to be written with the write data belongs to a specific area (for example, the system area 506) of the rewritable non-volatile memory chip 106, the memory management circuit 1043 determines that the write data belongs to the specific type.

Then, the memory management circuit 1043 notifies the ECC circuit 1047 to generate ECC codes with different lengths for different types of write data by sending parameters. To be specific, in the memory controller 104, only one ECC circuit 1047 is required to be configured, and the memory management circuit 1043 can control the ECC circuit 1047 to generate the ECC codes with different lengths by sending different parameters.

In detail, if the write data belongs to the specific type, the memory management circuit 1043 sends a first parameter to the ECC circuit 1047, and the ECC circuit 1047 generates at least one first type ECC code according to the first parameter and the write data, where each first type ECC code complies with a first length. If the write data does not belong to the specific type, the memory management circuit 1043 sends a second parameter to the ECC circuit 1047, and the ECC circuit 1047 generates at least one second type ECC code according to the second parameter and the write data, where each second type ECC code complies with a second length. In the present exemplary embodiment, the first length is greater than the second length, so that as long as the write data belongs to the specific type, the corresponding ECC code has a longer length. Therefore, the number of error bits of the write data belonging to the specific type that can be detected and corrected by the ECC circuit 1047 is relatively more.

Generally, each physical page includes a data bit area used for storing write data, a redundant bit area used for storing logical access addresses and related system data, and an error correction bit area used for storing the ECC codes. A data amount actually stored by a physical page having a page capacity of 4 kilobyte (KB) is 4320 bytes. It is assuming that a capacity of each data bit area is predetermined as 1024 bytes, and the first parameter sent by the memory management circuit 1043 corresponds to the first type ECC code with a length of 119 bytes, and the second parameter corresponds to the second type ECC code with a length of 51 bytes. The ECC codes of different lengths are configured with different configuration manners to store data, and FIG. 5A and FIG. 5B are schematic diagrams illustrating data configuration methods of physical pages used for storing different types of the write data according to an exemplary embodiment of the invention.

Figure 5A:
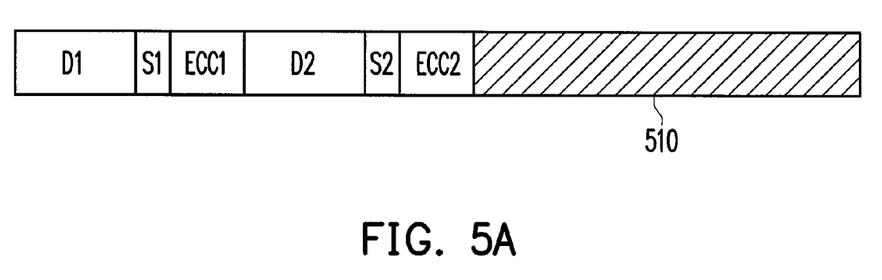
FIG. 5A and FIG. 5B are schematic diagrams illustrating data configuration methods of physical pages according to an exemplary embodiment of the invention.

Referring to FIG. 5A, in the present exemplary embodiment, the physical page 510 is used for storing the write data belonging to the specific type. The physical page 510 includes two data bit areas D1 and D2 (each has a capacity of 1024 bytes). The data bit area D1 corresponds to a redundant bit area S1 (with a capacity of 8 bytes) and an error correction bit area ECC1 (with a capacity of 119 bytes). The data bit area D2 corresponds to a redundant bit area S2 (with a capacity of 2 bytes) and an error correction bit area ECC2 (with a capacity of 119 bytes). An unused free space marked by oblique lines in FIG. 5A has a capacity of 2024 bytes.

It should be noticed that in the configuration of FIG. 5A, the free space marked by the oblique lines is enough for configuring another set of the data bit area, the redundant bit area and the error correction bit area respectively having capacities of 1024 bytes, 2 bytes and 119 bytes, so that in another exemplary embodiment of the invention, the physical page used for storing the write data belonging to the specific type may include three data bit areas.

Figure 5B:
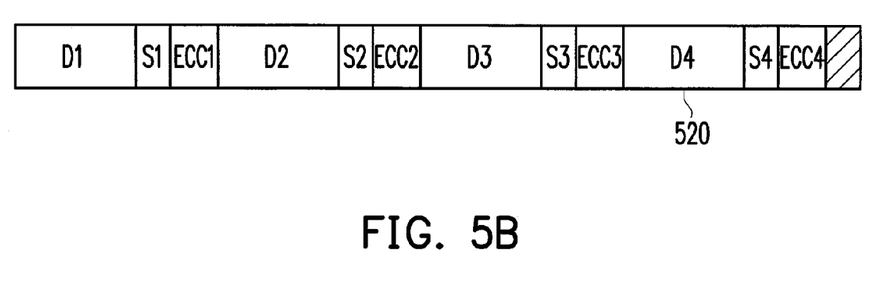

Referring to FIG. 5B, regarding a physical page 520 used for storing the write data that does not belong to the specific type, it includes four data bit areas D1, D2, D3 and D4 (each has a capacity of 1024 bytes) respectively corresponding to four redundant bit areas S1, S2, S3 and S4 (respectively having capacities of 8, 2, 2 and 2 bytes) and four error correction bit areas ECC1, ECC2, ECC3 and ECC4 (each has a capacity of 51 bytes). An unused free space marked by oblique lines in FIG. 5B has a capacity of 6 bytes.

By comparing FIG. 5A and FIG. 5B, it is discovered that a number of the data bit areas of the physical page 510 used for storing the write data belonging to the specific type is relatively less, so that compared to the physical page 520, the amount of write data stored in the physical page 510 is less. However, since each of the error correction bit areas ECC1 and ECC2 in the physical page 510 can store the ECC code with the length of 119 bytes, regarding each data bit area in the physical page 510, the number of error bits detected and corrected by the ECC circuit 1047 is 68 bits. Since each of the error correction bit areas in the physical page 520 can only store the ECC code with a length of 51 bytes, regarding each data bit area in the physical page 520, the number of error bits detected and corrected by the ECC circuit 1047 is 29 bits.

However, it should be noticed that the aforementioned page capacity of the physical page and the configurations of the stored data are only examples used for descriptions, and the invention is not limited thereto. Further, the memory management circuit 1043 calculates a maximum length of the ECC code supported by the ECC circuit 1047 according to a page capacity, a predetermined data bit area capacity and redundant bit area capacity of each physical page of the rewritable non-volatile memory chip 106, and takes the maximum length as the first length. Moreover, the memory management circuit 1043 calculates the number of first data bit area of the physical page used for storing the write data belonging to the specific type according to at least the page capacity, the data bit area capacity and the first length (in an exemplary embodiment, the memory management circuit 1043 calculates the number of first data bit area according to the page capacity, the data bit area capacity, the redundant bit area capacity and the first length). Besides, the memory management circuit 1043 determines a second length shorter than the first length, and calculates the number of second data bit area of the physical page used for storing the write data that does not belong to the specific type according to at least the page capacity, the data bit area capacity and the second length (in an exemplary embodiment, the memory management circuit 1043 calculates the number of second data bit area according to the page capacity, the data bit area capacity, the redundant bit area capacity and the second length). The number of first data bit area is smaller than the number of second data bit area.

The memory management circuit 1043 can determine data configurations of different types of the write data in the physical page according to the aforementioned methods. When the write data is written into the rewritable non-volatile memory chip 106, the memory management circuit 1043 first selects a corresponding data configuration according to whether the write data belongs to the specific type, and sends the corresponding parameter to the ECC circuit 1047. The ECC circuit 1047 generates an ECC code for each data segment complied with the data bit area capacity according to the data bit area capacity corresponding to the used data configuration and the length of the ECC code corresponding to the parameter. Then, the memory management circuit 1043 uses the buffer memory 3002 to trim the write data and the corresponding one or a plurality of ECC codes into the suitable data configuration, and writes them into one or a plurality of physical pages.

In detail, regarding the write data belonging to the specific type, the memory management circuit 1043 writes the write data and the corresponding at least one first type ECC code with the first length into one or a plurality of the physical pages according to the number of first data bit area. Regarding the write data that does not belong to the specific type, the memory management circuit 1043 writes the write data and the corresponding at least one second type ECC code with the second length into one or a plurality of the physical pages according to the number of second data bit area.

In the aforementioned exemplary embodiment, the memory storage device 100 only use the single ECC circuit 1047 to produce a longer ECC code for the write data belonging to the specific type, and produce a shorter ECC code for the write data that does not belong to the specific type. In this way, the number of error bits of the specific type data detected and corrected by the ECC circuit 107 can be increased, so as to improve stableness and reliability of the memory storage device 100.

Figure 6:
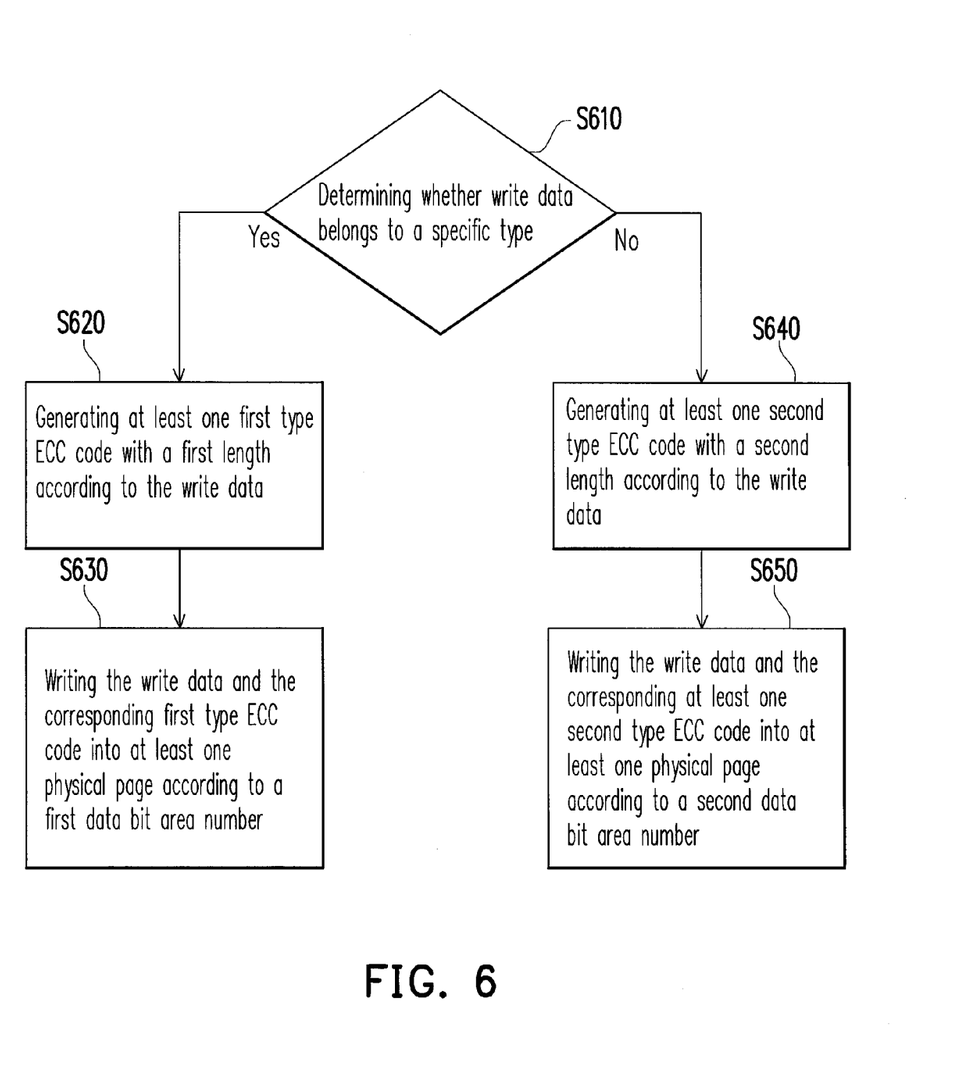
FIG. 6 is a flowchart illustrating a method for programming data according to an exemplary embodiment of the invention.

FIG. 6 is a flowchart illustrating a method for programming data according to an exemplary embodiment of the invention.

Referring to FIG. 6, when the memory management circuit 1043 wants to program the write data into the rewritable non-volatile memory chip 106, in step S610, the memory management circuit 1043 determines whether the write data belongs to the specific type, for example, determines whether the write data is not from the host system 1000, or whether the write data is to be written into the system area 506 of the rewritable non-volatile memory chip 106, or whether the write data is data other than user data.

When the write data belongs to the specific type, in step S620, the memory management circuit 1043 notifies the ECC circuit 1047 to generate at least one first type ECC code with a first length according to the write data. Then, in step S630, the memory management circuit 1043 writes the write data and the corresponding first type ECC code into at least one physical page according to the number of first data bit area.

When the write data does not belong to the specific type, in step S640, the memory management circuit 1043 notifies the ECC circuit 1047 to generate at least one second type ECC code with a second length according to the write data, and in step S650, the memory management circuit 1043 writes the write data and the corresponding at least one second type ECC code into at least one physical page according to the number of second data bit area.

In summary, the method for programming data, the memory controller and the memory storage device of the invention can determine a type of the write data and generate the ECC codes with different lengths according to different types of the write data. In this way, regarding the significant data that may directly influence the normal operation of the memory storage device, a relatively longer ECC code is generated to ensure detecting and correcting more number of the error bits, so as to improve stableness of the memory storage device. However, the advantages aforementioned not required in all versions of the present invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for programming data, adapted to a memory storage device coupled to a host system, wherein the memory storage device comprises an error checking and correcting (ECC) circuit and a rewritable non-volatile memory chip, and the rewritable non-volatile memory chip comprises a plurality of physical pages, wherein the rewritable non-volatile memory chip comprises a data area, a system area and a spare area, wherein a physical block storing user data is regarded as logically belonging to the data area, wherein a physical block logically belonging to the spare area is used for substituting the physical block logically belonging to the data area, wherein a physical block logically belonging to the system area is used for storing system data for managing the physical block logically belonging to the data area or the spare area, the method for programming data comprising:

determining whether write data to be written into the rewritable non-volatile memory chip belongs to a specific type;

generating at least one first type ECC code with a first length by the ECC circuit according to the write data when the write data belongs to the specific type; and     generating at least one second type ECC code with a second length by the ECC circuit according to the write data when the write data does not belong to the specific type, wherein the first length is longer than the second length,     wherein the step of determining whether the write data belongs to the specific type comprises: determining the write data belongs to the specific type if the write data is not from the host system, the write data is data other than user data, or the write data is to be written into the system area of the rewritable non-volatile memory chip.

2. The method for programming data as claimed in claim 1, wherein the step of generating the at least one first type ECC code with the first length by the ECC circuit according to the write data comprises:

receiving a first parameter by the ECC circuit; and generating the at least one first type ECC code according to the first parameter and the write data.

3. The method for programming data as claimed in claim 2, wherein the step of generating the at least one second type ECC code with the second length by the ECC circuit according to the write data comprises:

receiving a second parameter by the ECC circuit; and generating the at least one second type ECC code according to the second parameter and the write data.

4. The method for programming data as claimed in claim 1, wherein each of the physical pages has a page capacity, and the method further comprises:

defining a data bit area capacity, wherein the data bit area capacity is smaller than the page capacity;

calculating the number of first data bit area of the physical page used for storing the write data belonging to the specific type according to at least the page capacity, the data bit area capacity and the first length; and     calculating the number of second data bit area of the physical page used for storing the write data not belonging to the specific type according to at least the page capacity, the data bit area capacity and the second length, wherein the number of first data bit area is smaller than the number of second data bit area.

5. The method for programming data as claimed in claim 4, wherein after the step of generating the at least one first type ECC code with the first length by the ECC circuit according to the write data, the method further comprises:

writing the write data and the corresponding at least one first type ECC code with the first length into at least one of the physical pages according to the number of first data bit area.

6. The method for programming data as claimed in claim 4, wherein after the step of generating the at least one second type ECC code with the second length by the ECC circuit according to the write data, the method further comprises:

writing the write data and the corresponding at least one second type ECC code with the second length into at least one of the physical pages according to the number of second data bit area.

7. A memory controller, for managing a rewritable non-volatile memory chip in a memory storage device, wherein the rewritable non-volatile memory chip comprises a data area, a system area and a spare area, wherein a physical block storing user data is regarded as logically belonging to the data area, wherein a physical block logically belonging to the spare area is used for substituting the physical block logically belonging to the data area, wherein a physical block logically belonging to the system area is used for storing system data for managing the physical block logically belonging to the data area or the spare area, the memory controller comprising:

a host system interface, configured to couple to a host system;

a memory interface, configured to couple to the rewritable non-volatile memory chip, wherein the rewritable non-volatile memory chip comprises a plurality of physical pages;

an error checking and correcting (ECC) circuit; and a memory management circuit, coupled to the host system interface, the memory interface and the ECC circuit, wherein the memory management circuit determines whether write data to be written into the rewritable non-volatile memory chip belongs to a specific type, wherein the memory management circuit determines the write data belongs to the specific type if the write data is not from the host system, the write data is data other than user data, or the write data is to be written into the system area of the rewritable non-volatile memory chip,     wherein when the write data belongs to the specific type, the memory management circuit notifies the ECC circuit to generate at least one first type ECC code with a first length according to the write data,     when the write data does not belong to the specific type, the memory management circuit notifies the ECC circuit to generate at least one second type ECC code with a second length according to the write data, wherein the first length is longer than the second length.

8. The memory controller as claimed in claim 7, wherein the memory management circuit sends a first parameter to the ECC circuit, and the ECC circuit generates the at least one first type ECC code with the first length according to the first parameter and the write data.

9. The memory controller as claimed in claim 8, wherein the memory management circuit sends a second parameter to the ECC circuit, and the ECC circuit generates the at least one second type ECC code with the second length according to the second parameter and the write data.

10. The memory controller as claimed in claim 7, wherein each of the physical pages has a page capacity, and the memory management circuit defines a data bit area capacity smaller than the page capacity,     the memory management circuit calculates the number of first data bit area of the physical page used for storing the write data belonging to the specific type according to at least the page capacity, the data bit area capacity and the first length,     the memory management circuit calculates the number of second data bit area of the physical page used for storing the write data not belonging to the specific type according to at least the page capacity, the data bit area capacity and the second length, wherein the number of first data bit area is smaller than the number of second data bit area.

11. The memory controller as claimed in claim 10, wherein when the write data belongs to the specific type, the memory management circuit writes the write data and the corresponding at least one first type ECC code with the first length into at least one of the physical pages according to the number of first data bit area.

12. The memory controller as claimed in claim 10, wherein when the write data does not belong to the specific type, the memory management circuit writes the write data and the corresponding at least one second type ECC code with the second length into at least one of the physical pages according to the number of second data bit area.

13. A memory storage device, comprising:
a rewritable non-volatile memory chip, comprising a plurality of physical pages wherein the rewritable non-volatile memory chip comprises a data area, a system area and a spare area, wherein a physical block storing user data is regarded as logically belonging to the data area, wherein a physical block logically belonging to the spare area is used for substituting the physical block logically belonging to the data area, wherein a physical block logically belonging to the system area is used for storing system data for managing the physical block logically belonging to the data area or the spare area;
a connector, configured to couple to a host system; and
a memory controller, coupled to the rewritable non-volatile memory chip and the connector, wherein the memory controller determines whether write data to be written into the rewritable non-volatile memory chip belongs to a specific type, wherein the memory controller determines the write data belongs to the specific type if the write data is not from the host system, the write data is data other than user data, or the write data is to be written into the system area of the rewritable non-volatile memory chip,
wherein when the write data belongs to the specific type, the memory controller generates at least one first type ECC code with a first length according to the write data,
when the write data does not belong to the specific type, the memory controller generates at least one second type ECC code with a second length according to the write data, wherein the first length is longer than the second length.

14. The memory storage device as claimed in claim 13, wherein the memory controller comprises:
an ECC circuit, configured to generates the at least one first type ECC code with the first length according to a first parameter and the write data.

15. The memory storage device as claimed in claim 14, wherein the ECC circuit generates the at least one second type ECC code with the second length according to a second parameter and the write data.

16. The memory storage device as claimed in claim 13, wherein each of the physical pages has a page capacity, and the memory controller defines a data bit area capacity smaller than the page capacity,
the memory controller calculates the number of first data bit area of the physical page used for storing the write data belonging to the specific type according to at least the page capacity, the data bit area capacity and the first length,
the memory controller calculates the number of second data bit area of the physical page used for storing the write data not belonging to the specific type according to at least the page capacity, the data bit area capacity and the second length, wherein the number of first data bit area is smaller than the number of second data bit area.

17. The memory storage device as claimed in claim 16, wherein when the write data belongs to the specific type, the memory controller writes the write data and the corresponding at least one first type ECC code with the first length into at least one of the physical pages according to the number of first data bit area.

18. The memory storage device as claimed in claim 16, wherein when the write data does not belong to the specific type, the memory controller writes the write data and the corresponding at least one second type ECC code with the second length into at least one of the physical pages according to the number of second data bit area.

19. The method for programming data as claimed in claim 1, wherein the step of determining whether the write data belongs to the specific type further comprises:
determining the write data does not belong to the specific type if the write data is to be written into the data area of the rewritable non-volatile memory chip.

20. The memory controller as claimed in claim 7, wherein the memory management circuit determines the write data does not belong to the specific type if the write data is to be written into the data area of the rewritable non-volatile memory chip.

21. The memory storage device as claimed in claim 13, wherein the memory controller determines the write data does not belong to the specific type if the write data is to be written into the data area of the rewritable non-volatile memory chip.

* * * * *